PEDESTAL CANCELLATION AND VIDEO TRANSMISSION CIRCUIT

Filed May 23, 1961 2 Sheets-Sheet 1

INVENTOR
VERNON H. RITTER
BY Roy C. Hopgood
ATTORNEYS

Aug. 3, 1965 V. H. RITTER 3,199,034

PEDESTAL CANCELLATION AND VIDEO TRANSMISSION CIRCUIT

Filed May 23, 1961 2 Sheets-Sheet 2

INVENTOR
VERNON H. RITTER
BY Roy C. Hopgood
ATTORNEY

United States Patent Office 3,199,034

Patented Aug. 3, 1965

3,199,034
PEDESTAL CANCELLATION AND VIDEO TRANSMISSION CIRCUIT

Vernon H. Ritter, Boalsburg, Pa., assignor to HRB-Singer, Inc., State College, Pa., a corporation of Pennsylvania Filed May 23, 1961, Ser. No. 112,017
14 Claims. (Cl. 328—54)

This invention relates in general to a pedestal cancellation and video transmission circuit, and in particular to a single stage electronic amplifier circuit that operates to separate an information-bearing signal from a pedestal on which it is superimposed. Although the invention can be used in connection with any type of gated information signals, it is particularly useful in gated video signal applications.

Video signals are generated by a scanning process, and they are transmitted in gated pulses which correspond to respective traces of the scanning device. The video signal variations are usually superimposed on a rectangular pedestal pulse which is equal in time duration to one trace of the scanning device. In some applications the video signals and their pedestal are processed together, but in many other applications it is desirable to separate the video signals from their pedestal.

In the prior art, this separation has been accomplished by applying the combined video-pedestal signal to two independent amplifiers, clipping the output of one amplifier to form a synthetic pedestal pulse, inverting the synthetic pedestal pulse, and adding the inverted pulse to the output of the other amplifier, thus cancelling the pedestal without cancelling the video signals superimposed on the pedestal. This prior art method, however, had several notable drawbacks: first, it required a multiple stage circuit to complete the cancellation; and second, the time delays and signal distortion inherent in multiple-stage circuits made the cancellation incomplete. The synthetic pedestal never exactly matched the input pedestal in shape, pulse width, or starting time, and as a result rather wide residual spikes were produced at the start and end of the video signal.

Accordingly, one object of this invention is to provide a single stage pedestal cancellation circuit that operates to separate an information-bearing signal from a pedestal on which it is superimposed.

Another object of this invention is to provide a pedestal cancellation circuit in which time delays and signal distortion are minimized.

Another object of this invention is to provide a pedestal cancellation circuit in which the pulse width and amplitude of residual spikes are minimized.

Another object of this invention is to provide a pedestal cancellation circuit which is simpler in structure and lower in cost than those heretofore known in the art.

The above mentioned and other features and objects of this invention and the manner of attaining them will become more apparent and the invention itself will be best understood by reference to the following description of an embodiment of the invention taken in conjunction with the accompanying drawing, wherein.

Figure 1:
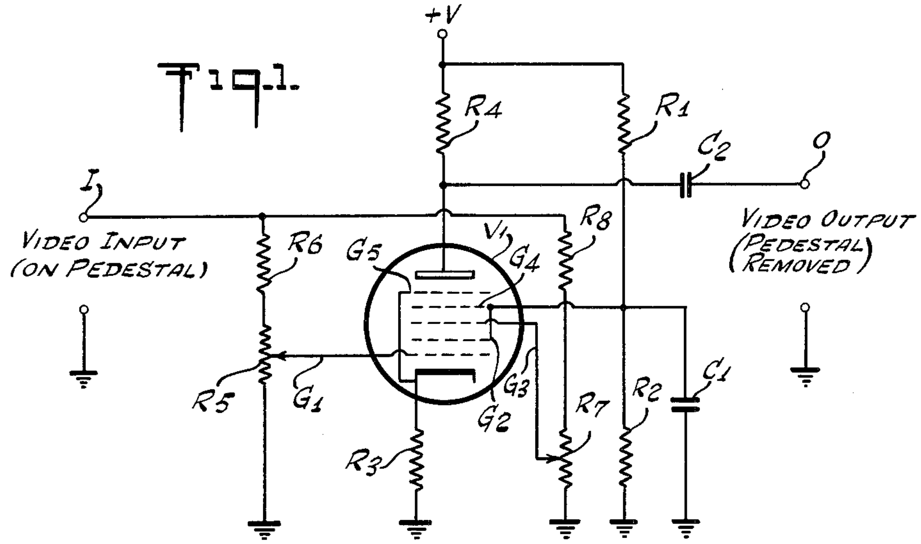
FIG. 1 is a schematic diagram of a first embodiment of the invention.

In the preferred embodiment, which is shown in FIG. 1, this invention employs a dual-control heptode vacuum tube V1. This tube contains 5 grids; a first control grid G1, a first screen grid G2, a second control grid G3, a second screen grid G4, and a suppressor grid G5. Screen grids G2 and G4 are coupled to a plate supply voltage V through a voltage divider comprising resistors R1 and R2, and both screen grids are grounded to video signals by a bypass capacitor C1. The cathode of V1 is coupled to ground through an unbypassed cathode resistor R3, and the plate is coupled to V through R4, which serves as a plate load resistor.

Figures 3A, 3B, 4, 5:
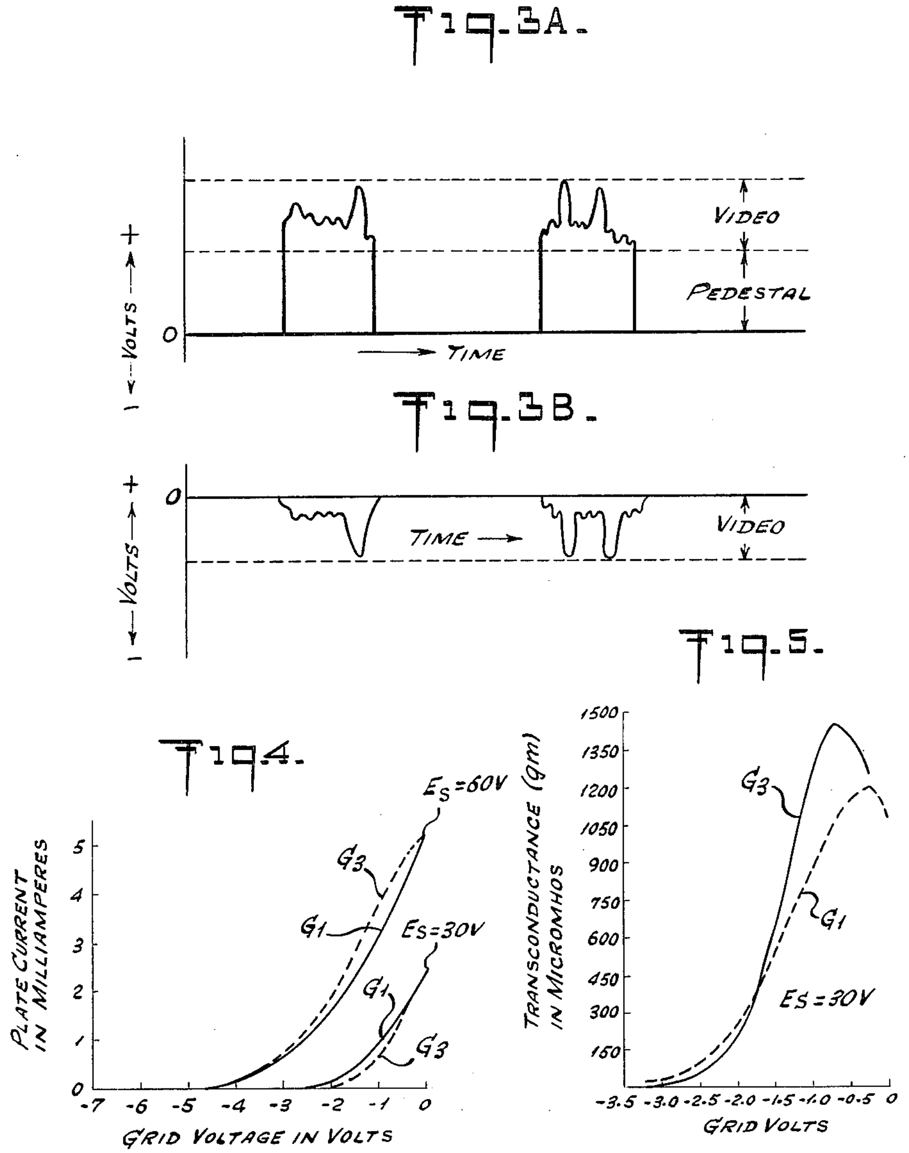
FIG. 3A is a waveform showing positive video input signals superimposed on a positive pedestal.
FIG. 3B is a waveform showing the signals of FIG. 3A inverted with the pedestals thereof eliminated.
FIG. 4 is a set of *Eg-Ip* characteristic curves for the vacuum tube of FIG. 1.
FIG. 5 is a set of *Gm-Eg* characteristic curves for the vacuum tube of FIG. 1.

Control grids G1 and G3 will each vary the plate current of V1 in accordance with input signal voltages, but the ratio of plate current change for a given increment of grid voltage change is not the same for the two control grids. This ratio, which is called transconductance or G*m*, is higher for one grid than the other, as shown in the *Ip-Eg* curves in FIG. 4 and the G*m*-E*g* curves in FIG. 5. The curves of FIGS. 4 and 5 illustrate the average characteristics of one common type of dual control heptode. Referring to FIG. 4, the plate characteristics with respect to each of the two grids is plotted with respect to two different values of screen voltage, *Es*=60 v. and *Es*=30 v. It will be evident from these curves that the effect of the two grids on plate current varies as a function of both the grid voltage and the screen voltage. Thus the transconductance, which is represented by the slope of the curves, varies as a function of grid voltage.

The change of transconductance with respect to grid voltage is more clearly shown in the curves of FIG. 5, which are plotted for *Es*=30 v. In the more negative region of the bias voltage range the transconductance of grid G1 predominates over the transconductance of grid G3, but in the more positive region of the bias voltage range the situation is reversed. The crossover point in this particular tube, at *Es*=30 v., occurs at *Eg*—1.75 v.

When the cathode of V1 is connected to an unbypasesd resistor, as shown in FIG. 1, the above described difference in transconductance can be used to form either an inverting amplifier or a non-inverting amplifier depending on the operating voltages selected and the signal grid used. Suppose, for example, that a screen grid voltage of 30 volts is used in the circuit of FIG. 1, so that grids G1 and G3 have the characteristics shown in FIG. 5, and that grid G3 is grounded while grid G1 receives a positive going signal input that is referenced to ground. Suppose further that cathode resistor R3 is selected to develop a voltage drop of 1.00 volt at the zero input tube current level so that both grids are initially biased to —1.00 volt with no signal input to grid G1. Under these conditions the G*m* of grid G3 will be higher than the G*m* of grid G1, as will be evident from the curves of FIG. 5.

The positive going signal applied to grid G1 tends to increase the plate current of V1, which in turn would raise its cathode potential and lower its plate potential. But an increase in cathode potential would be equivalent to a drop in potential at grid G3, and this drop in potential tends to decrease the plate current of V1, which would result in a rise of plate potential rather than a drop. Thus when grid G1 attempts to lower the plate potential of V1, grid G2 will attempt to raise its potential. And since the G*m* of grid G3 is higher, under the above noted conditions, than the G*m* of grid G1, the net result will be a rise in plate potential. Thus a positive going signal applied to G3 will produce a positive going signal at the plate of V1; in other words, the circuit will act as a non-inverting amplifier.

If grid G1 is grounded, however, and a positive going signal is applied to grid G3, the situation would be reversed. In this case the positive going input signal would produce a drop rather than a rise in plate potential, which means that the circuit will act as an inverting amplifier.

Thus for a given set of operating conditions the same circuit will act either as an inverting amplifier or a non-inverting amplifier depending on which grid the input signal is applied to.

In accordance with this invention it has been found that a set of conditions exist in which the input signal applied to one grid is completely cancelled by the cathode feedback signal developed thereby on the other grid. In this case the circiut is neither an inverting amplifier nor a non-inverting amplifier but rather a cancellation circuit. The exact cancellation point is very difficult to determine graphically because of the negative feedback applied to the signal input grid as a result of the unbypassed cathode resistor. For any given set of operating conditions, however, there is one particular voltage level on the signal grid which will not produce a corresponding change in plate potential. In other words, it is possible to ground grid G3, apply a flat topped pulse signal of the proper amplitude to grid G1, and to obtain no output pulse at the plate of V1. Although the signal amplitude required to produce this cancellation is difficult to determine graphically, it can be very easily determined in practice by the simple expedient of varying the input pulse amplitude until the cancellation is observed to occur and noting the amplitude at which it occurs. This can be done by placing a variable voltage divider network in series with the input signal and observing the plate waveform on an oscilloscope.

When the circuit of FIG. 1 is operated under cancellation conditions with a single signal input, however, it operates in a slightly non-linear manner and better linearity can be obtained by appling the same signal to both grids and adjusting both signal levels to obtain the cancellation condition. When the same recurring, flat topped pulse is simultaneously applied to both signal input grids of V1, the circuit action will depend not only on the zero signal conditions thereof but also on the relative magnitude of the two signal inputs. If the two input signals are equal the circuit will, under the zero signal conditions noted above, act as an inverting amplifier because of the higher transconductance of grid G3 with respect to grid G1. But if the signal on grid G1 is increased in magnitude relative to the signal on grid G3 the influence of grid G1 will increase notwithstanding its lower tranconductance. If the signal on grid G1 is increased far enough a point will be reached where the effect of grid G1 cancels out the effect of grid G3 so that no output pulses appear at the plate of V1. If the signal on grid G1 is increased still further, the effect of grid G3 will predominate over the effect of grid G1, and the circuit will begin to act as a non-inverting amplifier instead of an inverting amplifier. Therefore, if the circuit is adjusted to cancel out the recurring, flat topped pulses it will pass any video signals which are superimposed on top of those pulses, thus separating the video signals from the pulses on which they are superimposed.

Referring to FIG. 1, the combined video-pedestal signals such as shown in FIG. 3A are applied simultaneously to control grids G1 and G3 through variable voltage divider networks which can be used independently to vary the signal input to each grid. Grid G1 is coupled to an input terminal I through the wiper arm of a potentiometer R5 and a fixed resistor R6, and grid G3 is coupled to the same input terminal through the wiper arm of potentiometer R7 and fixed resistor R8. The relative magnitude of the input signals at the two grids can be adjusted by turning R5 and R7. In the operation of this embodiment of the invention, R5 and R7 are adjusted so that the cancellation level of the circuit coincides with the top of the input pedestal, whereby the pedestal is cancelled while the video signals appear as inverted output signals on the plate of V1, which is coupled through capacitor C2 to an output terminal O. The proper adjustment of R5 and R7 can be secured by coupling output terminal O to an oscilloscope and turning R5 and R7 for exact pedestal cancellation as observed on the oscilloscope display.

It should be noted here that the invention can also be used as a phase detector when similar but independent signals are applied to grids G1 and G3. In this case, R5 and R7 are adjusted for zero output when the two signals are in phase. Then when the two signals differ in phase they will develop a net signal which crosses the cancellation level and which therefore appears as an output signal in the plate circuit. The magnitude of this signal will be a function of the phase difference between the two signals, whereby the phase difference can be detected by measuring the amplitude of this output signal.

Figure 2:
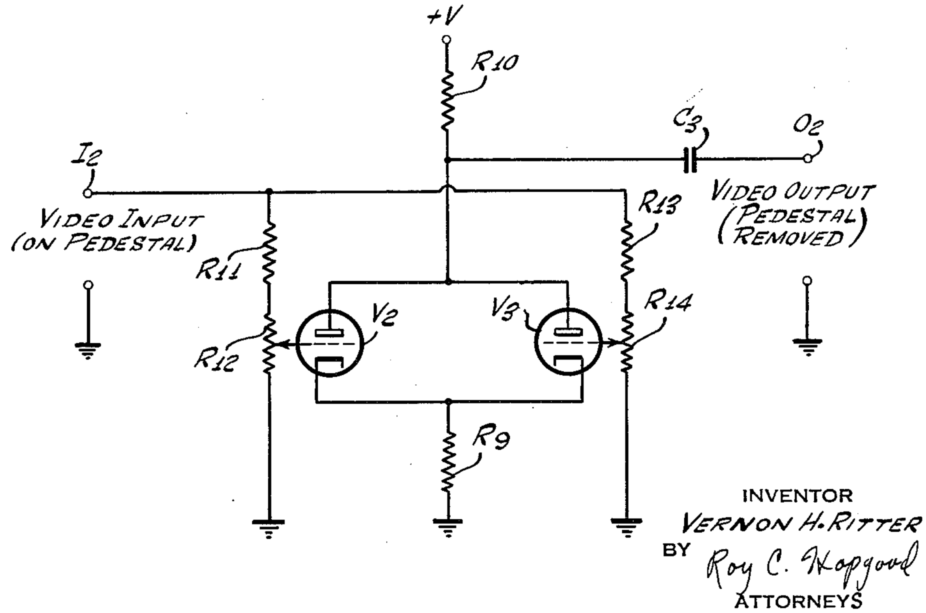
FIG. 2 is a schematic diagram of a second embodiment of the invention.

FIG. 2 shows a second embodiment of the invention which utilizes two triodes V2 and V3 in place of the heptode shown in FIG. 1. The cathodes of V2 and V3 are coupled in parallel to a common unbypassed cathode resistor R9 and their plates are coupled to a positive supply voltage +V through a common load resistor R10. V2 and V3 are selected to have different values of transconductance, and their grids are coupled to a common input terminal I2 through corresponding voltage divider networks comprising fixed resistors R11 and R13 and potentiometers R12 and R14. The output signal of this circuit is coupled from the plates of V2 and V3 through a coupling capacitor C3 to an output terminal O2. The operation of this circuit is identical to that of the heptode circuit shown in FIG. 1 and described above, with the exception of the comments relating to screen voltage.

From the foregoing description it will be apparent that this invention provides a novel single stage pedestal cancellation circuit that operates to separate an information-bearing signal from a pedestal on which it is superimposed. It will also be apparent that this invention provides a pedestal cancellation circuit in which time delays, signal distortion, and residual spikes are minimized. And it should be understood that this invention is by no means limited to the specific structures disclosed herein by way of example, since many modifications can be made in the structure disclosed without departing from the basic teaching of this invention. For example, when the information bearing signals are narrow band, the common cathode and plate resistors can be replaced by tuned circuits without altering the fundamental operation of the circuit. Furthermore, pentode vacuum tube amplifiers or transistors could be used in place of the triode amplifiers shown, and other voltage adjusting devices can be used in place of the potentiometers disclosed herein. These and many other modifications will be apparent to those skilled in the art, and this invention includes all modifications falling within the scope of the following claims.

I claim:

1. A pedestal cancellation circuit comprising first current amplification means having a current input terminal, a current output terminal, and a current control terminal; second current amplification means having a current input terminal, a current output terminal, and a current control terminal; said first and second current amplification means having different values of transconductance; said current input terminals being coupled to a common current input impedance and said current output terminals being coupled to a common current output impedance; means for applying a common input signal to each of said current control terminals; said input signal comprising a signal superimposed upon a pedestal; and means for independently adjusting the magnitude of the input signal applied to each current control terminal to produce an output in the form of a pedestal-free signal.

2. A pedestal cancellation circuit comprising a current amplifier device having a current input terminal, a current output terminal, and two current control terminals, said current amplifier device having one value of transconductance with respect to signals applied to one current control terminal and a different value of transconductance with respect to signals applied to the other current control terminal; a current input impedance coupled to said current input terminal; a current output impedance coupled to said current output terminal; means for coupling a common input signal to each of said current control terminals; said input signal comprising a signal superimposed upon a pedestal; and means for independently adjusting the magnitude of the input signal applied to each current control terminal to produce an output in the form of a pedestal-free signal.

3. A pedestal cancellation circuit comprising a pair of vacuum tube triodes coupled in parallel to a common cathode impedance and a common plate impedance, said triodes having different values of transconductance, means for coupling a common input signal to the grid of each triode, said input signal comprising a signal superimposed upon a pedestal, and means for independently adjusting the magnitude of the input signal applied to each grid to produce an output in the form of a pedestal-free signal.

4. The combination defined in claim 3 wherein said amplitude adjustment means comprises a variable voltage divider coupled in series between each grid and a common input terminal.

5. A pedestal cancellation circuit comprising a dual-control heptode vacuum tube amplifier having a first and second control grid, said heptode having one value of transconductance with respect to signals applied to one control grid and a different value of transconductance with respect to signals applied to the other control grid; the cathode of said heptode being coupled to a cathode impedance and the plate thereof to a plate impedance; means for coupling a common input signal to each of said control grids; said input signal comprising a signal superimposed upon a pedestal, and means for independently adjusting the magnitude of the input signal applied to each grid to produce an output in the form of a pedestal-free signal.

6. The combination defined in claim 5 wherein said amplitude adjustment means comprises a variable voltage divider coupled in series between each grid and a common input terminal.

7. A pedestal cancellation circuit comprising a vacuum tube amplifier containing a plate electrode, a cathode electrode, and two control grid electrodes, said vacuum tube amplifier having one value of transconductance with respect to signals applied to one control grid and a different value of transconductance with respect to signals applied to the other control grid, the cathode of said vacuum tube amplifier being coupled to a first impedance element and the plate thereof being coupled to a second impedance element, means for coupling a common input signal to both of said control grids, said input signal comprising a signal superimposed upon a pedestal, and means for independently adjusting the magnitude of the signal applied to each control grid to produce an output in the form of a pedestal-free signal.

8. A signal cancellation circuit comprising a current conduction path, a first current control electrode in the current conduction path, the first current control electrode being adapted to vary the magnitude of current flow in said current conduction path in accordance with an input signal applied thereto, a second current control electrode in the current conduction path, the second current control electrode being adapted to vary the magnitude of current flow in said current conduction path in accordance with an input signal applied thereto, one of said current control electrodes having a higher value of transconductance than the other, signal transfer means adapted to couple signals from one current control electrode to the other, said signal transfer means being adapted to invert signals transferred therethrough, signal input means coupled to one of said current control electrodes for coupling an input signal thereto, said latter mentioned input signal comprising a signal superimposed upon a pedestal, and means coupled to said current control electrodes for setting the input signals applied thereto to predetermined levels to cause said current conduction path to produce an output in the form of a pedestal-free signal.

9. The combination defined in claim 8 wherein said current conduction path is divided into two parallel branches at some point therein and wherein one of said current control electrodes is located in one of said parallel branches and wherein the other current control electrode is located in the other of said branches.

10. An electrical circuit comprising electrical means defining a current conduction path, a first and a second current control electrode in the current conduction path, each of said current control electrodes being adapted to vary the magnitude of current flow in said current conduction path in accordance with an input signal applied thereto, and one of said current control electrodes being adapted to produce a greater variation of current than the other in response to the same input signal, signal transfer means adapted to couple signals from one current control electrode to the other, said signal transfer means being adapted to invert signals transferred therethrough such that an input signal which tends to increase the current flow when applied to one control electrode will tend to decrease the current flow when transferred through said signal transfer means to the other current control electrode, signal input means coupled to one of said current control electrodes for coupling an input signal thereto, said latter mentioned input signal comprising a signal superimposed upon a pedestal and signal output means coupled to said current conduction path and responsive to variations of current therein for developing an output in the form of a pedestal-free signal.

11. The combination defined in claim 10 and also including signal input means coupled to the other current control electrode and means for varying the magnitude of an input signal applied to one current control electrode with respect to the input signal applied to the other current control electrode and vice versa.

12. The combination defined in claim 11 wherein said current conduction path is divided into two parallel branches at some point therein and wherein one of said current control electrodes is located in one of said parallel branches and wherein the other current control electrode is located in the other of said branches.

13. The combination defined in claim 12 wherein said signal transfer means comprises an impedance element coupled in series with said current conduction path, and wherein said signal input means are each coupled between the corresponding current control electrode and the end of said impedance element which is farthest removed from said current control electrode along said current conduction path.

14. The combination defined in claim 13 wherein each of said signal input means comprises a variable voltage divider network coupled between the corresponding current control electrode and the end of said impedance element which is farthest removed from said current control electrode along said current conduction path.

References Cited by the Examiner

UNITED STATES PATENTS

| | | | |
|---|---|---|---|
| 2,679,002 | 5/54 | White | 328—135 X |
| 2,731,557 | 1/56 | Clayden | 328—173 X |
| 2,793,347 | 5/57 | Clark | 328—133 X |
| 2,806,946 | 9/57 | Rich | 328—134 X |
| 2,841,708 | 7/58 | Harper | 328—102 X |

FOREIGN PATENTS 1,041,341 10/53 France.

OTHER REFERENCES

Peterson et al., Sylvania News, vol. 22, No. 9, November 1955 (pp. 5 to 8).

ARTHUR GAUSS, *Primary Examiner.*

GEORGE N. WESTBY, *Examiner.*